(12) United States Patent
Alexander et al.

(10) Patent No.: US 9,495,405 B2
(45) Date of Patent: Nov. 15, 2016

(54) BIG DATA ANALYTICS BROKERAGE

(71) Applicant: International Business Machines Corporation, Armonk, NY (US)

(72) Inventors: Tabari H. Alexander, Peekskill, NY (US); John A. Bivens, Ossining, NY (US); Michael C. Buzzetti, Poughkeepsie, NY (US); Yuk L. Chan, Poughkeepsie, NY (US); Derrick L. Washington, Research Triangle, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 14/263,295

(22) Filed: Apr. 28, 2014

(65) Prior Publication Data

US 2015/0310015 A1    Oct. 29, 2015

(51) Int. Cl.
*G06F 17/30* (2006.01)

(52) U.S. Cl.
CPC ............................... *G06F 17/30359* (2013.01)

(58) Field of Classification Search
CPC ................. G06F 17/30864; G06F 17/30867; G06Q 30/02
USPC ........ 707/748, 722, 603, 769.736, 766, 600, 707/714, 723, 774, 728, 759, 769, 602, 729, 707/793, 758; 705/7.32, 14.54
See application file for complete search history.

(56) References Cited

U.S. PATENT DOCUMENTS 6,611,829 B1 * 8/2003 Tate .................. G06F 17/30445
707/714
7,720,846 B1 * 5/2010 Bayliss ............. G06F 17/30598
707/736
7,725,463 B2    5/2010 Hurst-Hiller et al.
8,024,336 B2    9/2011 Wai (Continued)

FOREIGN PATENT DOCUMENTS

WO    2011153171 A2    12/2011

OTHER PUBLICATIONS

Alvarez, Sergio A., "Web metasearch as belief aggregation", Paper, American Association for Artificial Intelligence, 2000, 5 pages.

(Continued)

*Primary Examiner* — Mariela Reyes
*Assistant Examiner* — Thong Vu
(74) *Attorney, Agent, or Firm* — Cantor Colburn LLP; William A. Kinnaman, Jr.

(57) ABSTRACT

In one embodiment, a computer-implemented method includes receiving a query. A target confidence level is established for the query, the target confidence level representing a requested level of accuracy for a result of the query. At least one individual confidence level is assigned to each of a plurality of analytics engines. One or more analytics engines are queried based on the query. A group of the analytics engines are selected, by a computer processor, where the analytics engines in the selected group have query responses to the query that are deemed to be similar to one another, and where the selection of the selected group is at least partially based on the target confidence level. The query responses from the selected group of analytics engines are summarized into a final result, where the final result is an answer to the query.

20 Claims, 5 Drawing Sheets

(56) References Cited

U.S. PATENT DOCUMENTS

| | | | | |
|---|---|---|---|---|
| 8,185,545 B2* | 5/2012 | Reisman | ............ | G06F 17/30648 707/769 |
| 8,650,181 B2* | 2/2014 | Dipper | ............ | G06F 17/30436 707/714 |
| 9,009,146 B1* | 4/2015 | Lopatenko | ........ | G06F 17/30867 707/723 |
| 2004/0249810 A1* | 12/2004 | Das | ................... | G06F 17/30536 |
| 2005/0240456 A1* | 10/2005 | Ward | ..................... | G06Q 40/00 705/35 |
| 2005/0256848 A1* | 11/2005 | Alpert | ............... | G06F 17/30867 |
| 2009/0006349 A1* | 1/2009 | Fuxman | ............ | G06F 17/30592 |
| 2009/0119259 A1 | 5/2009 | Williams et al. | | |
| 2010/0023502 A1 | 1/2010 | Marlow | | |
| 2010/0070486 A1* | 3/2010 | Punaganti Venkata | ............ | G06F 17/30893 707/722 |
| 2010/0094878 A1* | 4/2010 | Soroca | .............. | G06F 17/30035 707/748 |
| 2010/0161605 A1* | 6/2010 | Gabrilovich | ........... | G06Q 30/02 707/736 |
| 2010/0312773 A1* | 12/2010 | Boerries | ............. | G06F 17/3064 707/759 |
| 2011/0078127 A1 | 3/2011 | Lin et al. | | |
| 2011/0225152 A1* | 9/2011 | Beaudreau | ........ | G06F 17/30867 707/728 |
| 2012/0053992 A1 | 3/2012 | Erol et al. | | |
| 2012/0158702 A1 | 6/2012 | Kumar et al. | | |
| 2012/0158765 A1* | 6/2012 | Kumar | ............. | G06F 17/30646 707/766 |
| 2012/0232955 A1* | 9/2012 | Riazzi | .................... | G06Q 30/02 705/7.32 |
| 2013/0246335 A1* | 9/2013 | Ahuja | ............... | G06F 17/30713 707/600 |
| 2014/0046889 A1* | 2/2014 | Biem | .................... | G06F 19/345 706/46 |
| 2014/0278782 A1* | 9/2014 | Damerdji | ........... | G06Q 30/0203 705/7.32 |
| 2014/0280338 A1* | 9/2014 | Metz | ................... | H04L 41/0853 707/774 |
| 2015/0012482 A1* | 1/2015 | Alsanousi | ............... | G06F 19/24 707/603 |
| 2015/0025970 A1* | 1/2015 | Ogawa | .............. | G06Q 30/0242 705/14.54 |

OTHER PUBLICATIONS

Baeza-Yates et al., "Efficiency Trade-Offs in Two-Tier Web Search Systems", SIGIR' 09, Jul. 19-23, 2009, Boston, Massachusetts, ACM, pp. 163-170, 2009.

List of IBM Patents or Patent Applications Treated as Related; Dec. 8, 2014, 2 pages.

Tabari H. Alexander et al., pending U.S. Appl. No. 14/549,611 entitled "Big Data Analytics Brokerage," filed with the U.S. Patent and Trademark Office on Nov. 21, 2014.

* cited by examiner

BIG DATA ANALYTICS BROKERAGE

BACKGROUND

Various embodiments of this disclosure relate to data analytics and, more particularly, to brokering data retrieval from a large set of data sources according to client requirements.

The analysis of Big Data, i.e., large and complex data sets, can provide insights that impact business, stock investments, national security, and many other areas. In some cases, Big Data analysis can affect a business's bottom line and determine that business's fate within its industry. Because Big Data can be unwieldy, making the important decision about which analytics engines to use can be a challenging task. The analytics engines used can affect the cost of a query, accuracy of the query result, and responsiveness in answer to the query.

The International Data Corporation (IDC) estimated that 1.8 zettabytes of data would be created in 2011, and this annual amount of data grows exponentially. Examining every piece of data and using every analytics engine, is impossible in some cases and inefficient in others. Thus, generally only a small subset of available data is used to make decisions. In some cases, certain algorithms or data sources for answering specialized queries are available only from certain analytics engines, and some data sources may be better for some queries than for others. It is therefore important to select appropriate analytics engines, dependent on the queries at hand. These considerations, along with the amount of data, present a significant barrier to providing effective data analytics.

SUMMARY

In one embodiment of this disclosure, a computer-implemented method includes receiving a query. A target confidence level is established for the query, the target confidence level representing a requested level of accuracy for a result of the query. At least one individual confidence level is assigned to each of a plurality of analytics engines. One or more analytics engines are queried based on the query. A group of the analytics engines are selected, by a computer processor, where the analytics engines in the selected group have query responses to the query that are deemed to be similar to one another, and where the selection of the selected group is at least partially based on the target confidence level. The query responses from the selected group of analytics engines are summarized into a final result, where the final result is an answer to the query.

In another embodiment, a system includes an initialization unit, a confidence unit, and a query unit. The initialization unit is configured to receive a query and establish a target confidence level for the query, the target confidence level representing a requested level of accuracy for a result of the query. The confidence unit is configured to assign at least one individual confidence level to each of a plurality of analytics engines. The query unit is configured to query one or more analytics engines based on the query; select a group of the analytics engines whose query responses to the query are deemed to be similar to one another, where the selection of the group is at least partially based on the target confidence level; and summarize into a final result the query responses from the selected group of analytics engines, the summarized result being an answer to the query.

In yet another embodiment, a computer program product includes a computer readable storage medium having computer readable program code embodied thereon. The computer readable program code is executable by a processor to perform a method. The method includes receiving a query. Further according to the method, a target confidence level is established for the query, the target confidence level representing a requested level of accuracy for a result of the query. At least one individual confidence level is assigned to each of a plurality of analytics engines. One or more analytics engines are queried based on the query. A group of the analytics engines are selected, where the analytics engines in the selected group have query responses to the query that are deemed to be similar to one another, and where the selection of the selected group is at least partially based on the target confidence level. The query responses from the selected group of analytics engines are summarized into a final result, where the final result is an answer to the query.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An exemplary embodiment of this disclosure enables a data provider to assist a client in selecting one or more appropriate analytics engines and related data sources, such that the cost and accuracy of the query result is in accordance with the client's requirements. An analytics system according to this disclosure may utilize a client-provided confidence level (i.e., a measurement of accuracy) and output a result that matches that confidence level.

For each query sent by a client to the analytics system, the analytics system may output a result that is accurate to the degree indicated by the client's requested confidence level. The cost of such result to the client may be based on various factors, including, for example, the requested confidence level, responsiveness, and which analytics engines are used to respond to the query. Thus, a trade-off may be established between cost and accuracy, as well as between cost and responsiveness. Additionally, the analytics system may assist clients by enabling them to get the data they need without having prior knowledge about the various available analytics engines and their specializations.

Figure 1:
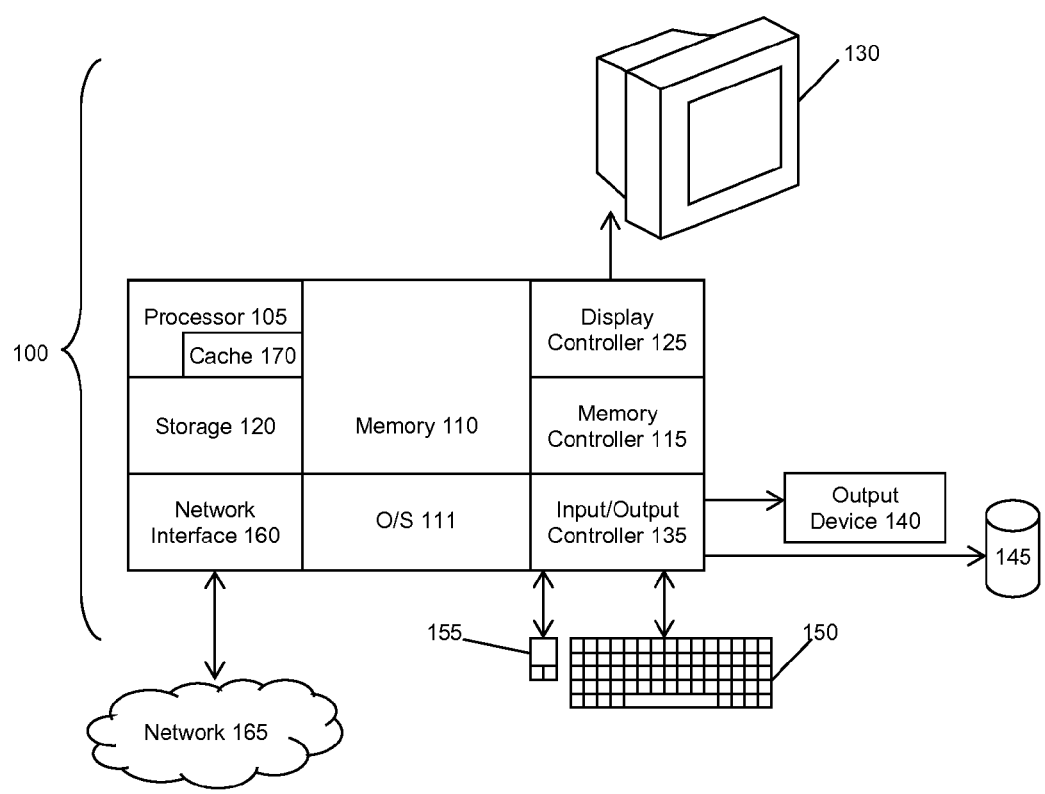
FIG. 1 illustrates a block diagram of a computer system for use in implementing an analytics system or method, according to some embodiments of this disclosure.

FIG. 1 illustrates a block diagram of a computer system 100 for use in implementing an analytics system or method according to some embodiments. The analytics systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services. The instructions in memory may further include instructions for providing some or all aspects of the analytics systems and methods, according to this disclosure.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Analytics systems and methods according to this disclosure may be embodied, in whole or in part, in computer program products or in computer systems 100, such as that illustrated in FIG. 1.

Figure 2:
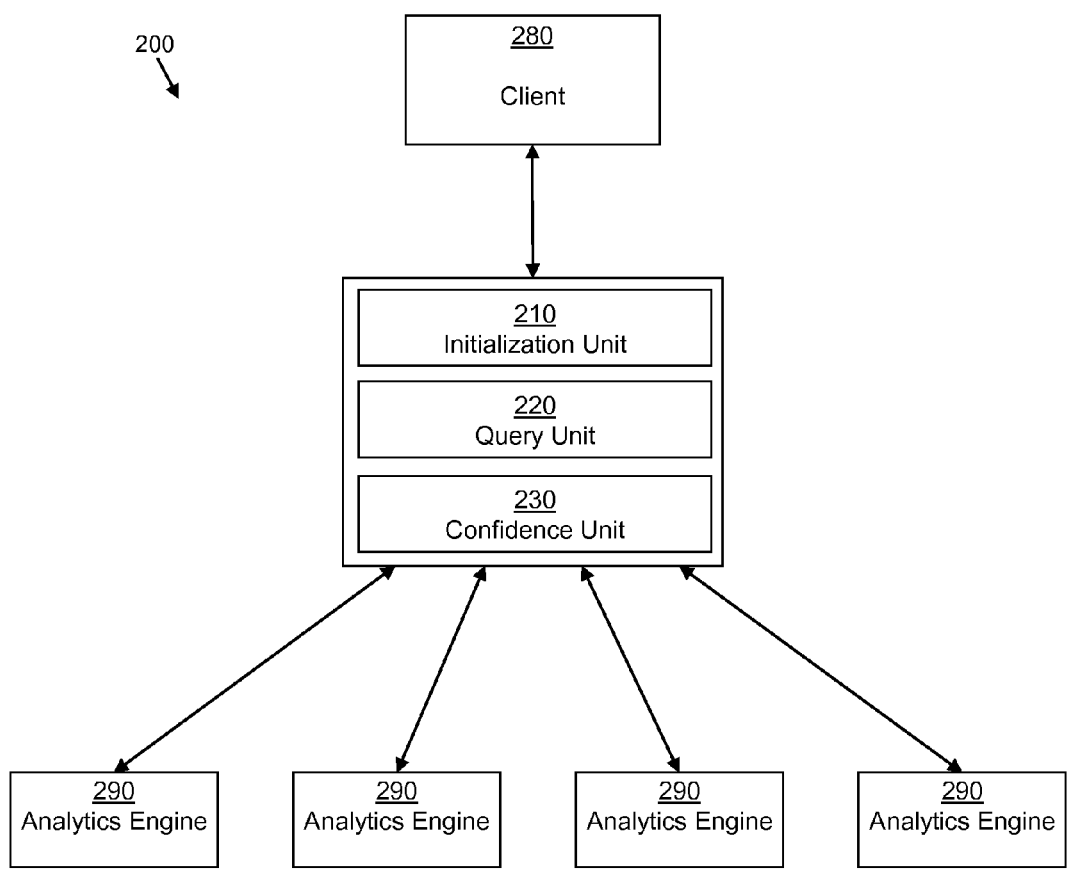
FIG. 2 is a block diagram of an analytics system, according to some embodiments of this disclosure.

FIG. 2 is a block diagram of an analytics system 200, according to an exemplary embodiment of this disclosure. As shown, the analytics system 200 may include an initialization unit 210, a query unit 220, and a confidence unit 230. The analytics system 200 may receive a query from a client 280, and may transmit one or more second-level queries to a set of the analytics engines 290 as a result. Generally, the initialization unit 210 may perform initialization tasks, including selecting a preliminary set of analytics engines 290 to be queried; the query unit 220 may query the preliminary set; and the confidence unit 230 may adjust confidence levels of the analytics engines 290 as needed. Each of these units 210-230 may include hardware, software or a combination of both. Although these units 210-230 are described herein as being distinct, such distinction is provided for illustrative purposes only. The initialization unit 210, the query unit 220, and the confidence unit 230 may contain overlapping hardware, software, or both, depending on the specific implementation used.

Analytics engines 290 usable by the analytics system 200 may include, for example, one or more search engines, knowledge engines, database engines, or various other systems to analyze structured or unstructured data. In some embodiments, an analytics engine 290 may be tied to a particular data source. Thus, a first search engine applied to a first data source may be deemed a distinct analytics engine 290 from that first search engine as applied to a distinct, second data source. Through its ability to query multiple analytics engines 200 corresponding to each client query, the analytics system 200 may not only respond to a client's query, but may also determine confidence levels of the various analytics engines 290 used. These confidence levels may be based, at least in part, on the various results received from the analytics engines 290 in the past.

The analytics system 200, such as via the confidence unit 230, may assign at least one confidence level to each analytics engine 290. In some embodiments, queries may be categorized and an analytics engine 290 may have a separate confidence level for each category. Categorized confidence levels may enable the analytics system 200 to take into consideration that an analytics engine 290 may provide better results with respect to some categories of queries than others. It will be understood that, throughout this disclosure, use of the term "confidence level" with respect to an analytics engine 290 may refer to a confidence level corresponding to a specific category of queries, where applicable, or to the confidence level of the analytics engine 290 overall. Through queries and feedback from query results, the analytics system 200 may modify or refine the confidence levels of the various analytics engines 290, as will be discussed further below.

Each analytics engine 290 may be assigned a default confidence level, which may or may not vary across the analytics engines 290 and across categories for each analytics engine 290. For example, if a specific engine 290 is known in the industry to provide accurate results, the analytics system 200 may initially provide a relatively high confidence level to that analytics engine 290. Alternatively, for example, all analytics engines might be assigned the same default confidence levels regardless of reputation. Default confidence levels may be assigned automatically based on rules, or may be assigned manually, or may be assigned based on a combination of automated and manual operations. A default confidence level may be in effect until the associated analytics engine 290 is used and its confidence level is adjusted accordingly.

Confidence levels may be represented in various ways. For example, and not by way of limitation, each confidence level may be represented numerically, such as by a number in the range of 1 to 100. For further example, confidence levels of new analytics engines 290, low-confidence analytics engines 290, medium-confidence analytics engines 290, and high-confidence analytics engines 290 may be, respectively, 20, 40, 60, and 80. It will be understood that other representations may be used for confidence levels, according to specific implementations of the analytics system 200.

When the analytics system 200 receives a query from a client 280, the analytics system 200 may respond to that query by providing data to the client 280. This data may be retrieved from the analytics engines 290, based at least in part on a target confidence level and a client-provided cost associated with the query.

Figure 3:
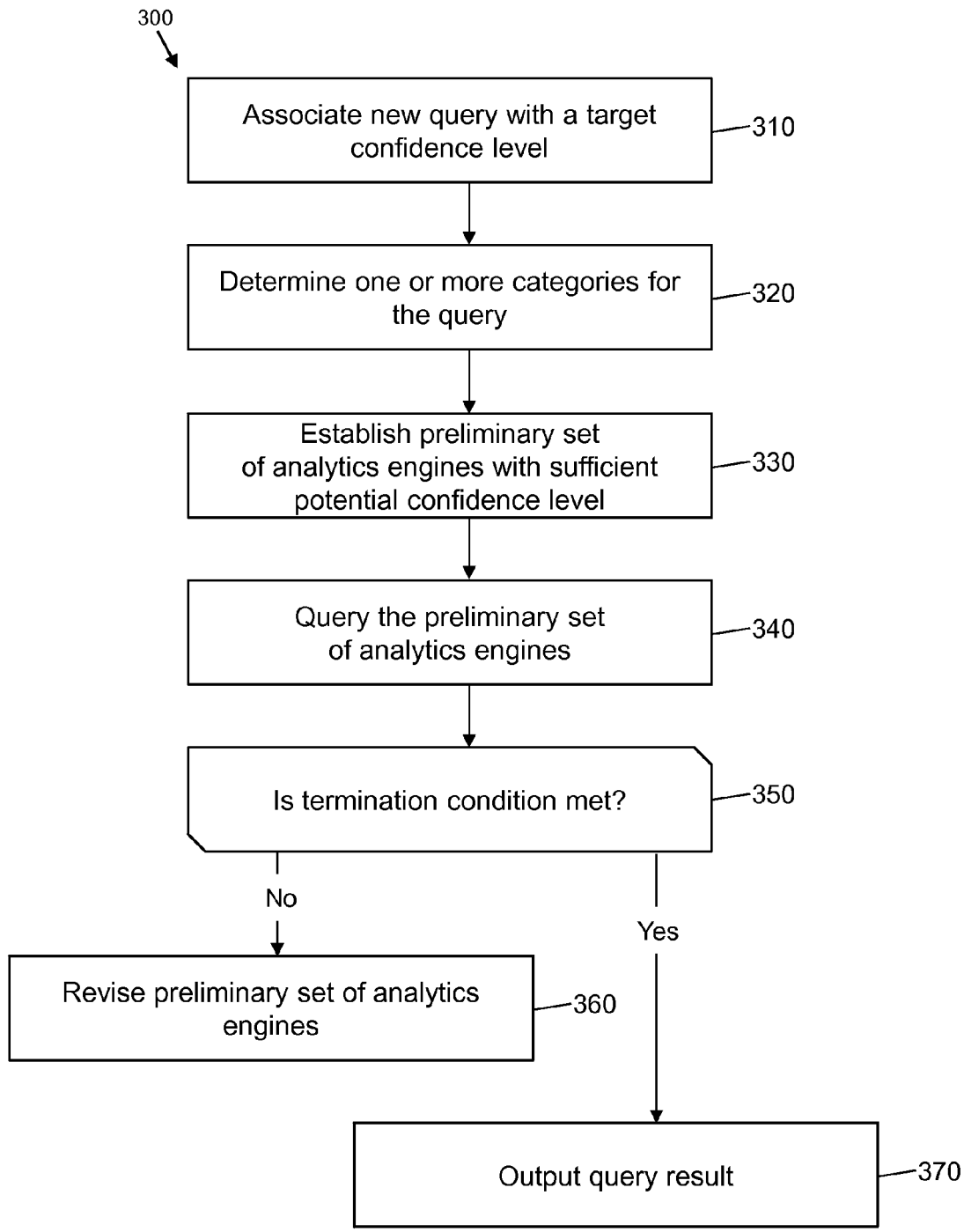
FIG. 3 is a flow diagram of a method for responding to a query from a client, according to some embodiments of this disclosure.

FIG. 3 illustrates a flow diagram of a method 300 for responding to a query from a client. As shown, at block 310, the analytics system 200 may associate a received query with a target confidence level, which target confidence level may be established by the client. At block 320, the analytics system 200 may determine one or more categories for the query. These categories may determine which confidence levels of the analytics engines 290 are considered. At block 330, a preliminary set of analytics engines 290 may be established, where the preliminary set is deemed to have potential to reach the target confidence level. At block 340, the preliminary set of analytics engines 290 may be queried. At block 350, it may be determined whether a termination condition is met based on output from the queried analytics engines 290. That termination condition may be, for example, that a group confidence level of the preliminary set of analytics engines 290 meets the target confidence level. If the termination condition is not met, then at block 360, the preliminary set of analytics engines may be revised and additional analytics engines 290 may be queried until the termination condition is met. When the termination condition is met, a query result may be output at block 370.

The result provided in response to the client query may depend, at least in part, on the target confidence level. The target confidence level may be indicative of the accuracy requested by the client 280 for the result of the query. In some embodiments, the analytics system 200 may seek to ensure that the client 280 does not choose a target confidence level that is not likely to be achieved based on the current confidence levels of available analytics engines 290. In that case, the analytics system 200, such as through the initialization unit 210, may first determine the highest reasonable and lowest reasonable confidence levels that can result from querying the analytics engines 290. The analytics system 200 may then enable the client 280 to choose a confidence level from within the available range. Thus, the requested confidence level may be limited based on the various confidence levels of the analytics engines 290.

For example, and not by way of limitation, the analytics system 200 may select, as the lowest selectable confidence level, the confidence level associated with the analytics engine 290 having the lowest confidence level with respect to the query. For the highest possible confidence value, the analytics system 200 may calculate the overall confidence level that would result if all the analytics engines 290 provided the same answer to the query. In some embodiments, the analytics system 200 may further limit the requested confidence level by disallowing any requests exceeding a predetermined fraction of that maximum possible confidence level. This further limitation may be made based on an understanding that it is unlikely for all analytics engines 290 to agree on the same exact result. If the query is categorized, as will be discussed further below, then the allowed range for the target confidence level may be based on the confidence levels with respect to the applicable categories. If the analytics system 200 determines that a requested confidence level should be limited, the analytics system 200 may inform the user of which confidence levels are available. The user can then select a target confidence level within the allowed range.

In some embodiments, at block 320 of FIG. 3, the analytics system 200 may categorize the client's query. As discussed above, an analytics engine 290 may have an overall confidence level, a confidence level for each category in which it is available, or both. Categorization may be used in various ways. For example, some analytics engines 290 may be useful or available for only certain categories of queries and not others. With categorization, confidence levels may provide a better indication of competence than would general confidence levels.

Various mechanisms may be used to identify one or more categories for a received query. For example, the query unit 210 or other aspect of the analytics system 200 may identify one or more keywords associated with the query, which keywords may be part of the query itself or may be deemed otherwise related to the query. In some embodiments, the analytics system 200 may use the keywords to choose the one or more categories, such that the categories chosen are those categories available with the highest association with the identified keywords, as compared to other categories. Accordingly, the query unit 210 may map the selected keywords to one or more categories. For example, and not by way of limitation, Slot Grammar Parser by International Business Machines (IBM) may be used to determine categories from the keywords.

Figure 4:
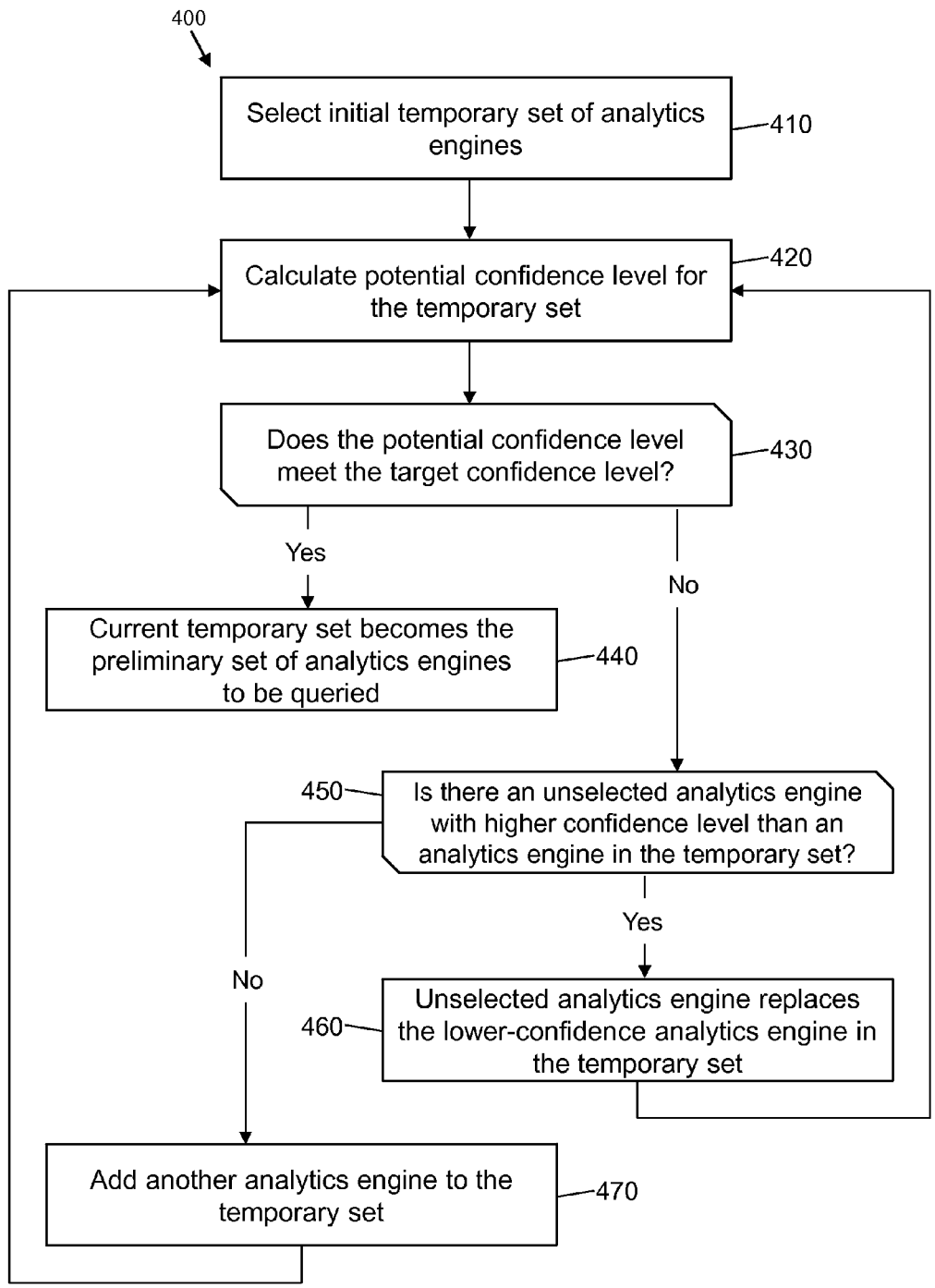
FIG. 4 is a flow diagram of a method for selecting a preliminary set of analytics engines in responding to a query, according to some embodiments of this disclosure.

In some embodiments, as shown at block 330 of FIG. 3, the initialization unit 210 or other aspect of the analytics system 200 may select a preliminary set of analytics engines 290 deemed likely to meet the target confidence level with their result. FIG. 4 illustrates a flow diagram of a method 400 for selecting such a preliminary set of analytics engines 290.

As shown, at block 410, the analytics system 200 may select an initial temporary set of analytics engines 290, where the initial temporary set may include a predetermined quantity of analytics engines 290. In an exemplary embodiment, that predetermined quantity may be a number chosen provide some diversity in the eventual results received from the analytics engines 290. For example, and not by way of limitation, the predetermined quantity may be five.

In some further exemplary embodiments, the analytics engines 290 selected for the initial temporary set may include analytics engines 290 with a combination of high, medium, and low confidence levels. In some other exemplary embodiments, however, the analytics engines 290 may be chosen to all have relatively high confidence levels. It will be understood, however, that including analytics engines 290 with lower confidence levels may enable the analytics system 200 to further refine the confidence levels of those low-confidence engines 290 and to allow change in those confidence levels as the analytics engines 290 improve. If an analytics engine 290 is always passed over due to a low confidence level, for example, it will not have the opportunity for its confidence level to improve. Thus, it may be useful to provide a mix of confidence levels when selecting the initial temporary set of analytics engines 290. Some analytics engines 290 may require payment to respond to queries. Thus, in some embodiments, the set of analytics engines 290 may be selected so that the cost of querying all of such analytics engines 290 does not exceed a target cost, which may be based on a client-provided cost.

In some embodiments, the target cost may be the same as the client-provided cost, representing the most the client 280 is willing to spend on the query. In some other embodiments, however, the target cost may be a percentage of the client-provided cost. For example, the target cost may be chosen to be lower than the provided cost if the analytics system 200 or its provider seeks to be conservative about the costs of querying. On the other hand, the target cost may be greater than the provided cost if the analytics system 200 or its provider wish to return high value to the client 280.

In some embodiments, selecting an initial temporary set of analytics engines 290 may include selecting a first analytics engine 290 for the initial temporary set, and then selecting one or more additional analytics engines 290. For example, the first analytics engine 290 may be selected so as not to exceed a predetermined percentage of the target cost. Using a fixed percentage to limit the cost of the first analytics engine 290 may provide a buffer in the target cost to ensure that the target confidence level can be met before the target cost is all allotted to selected analytics engines 290.

At block 420, after the initial temporary set of analytics engines 290 have been selected, a potential confidence level may be calculated for the temporary set as a whole. In some embodiments, calculating the potential confidence level need not require actually querying the initial temporary set, as sending actual queries can cost money. Rather, the potential confidence level may be based on the various confidence levels of the analytics engines 290, and may be further based on one or more assumptions about how the results of querying such analytics engines 290 would be in agreement or disagreement with one another. For example, and not by way of limitation, the potential confidence level may be calculated using the assumption that all the analytics engines 290 in the temporary set agree in their results to the query. In this case, the potential confidence level may represent a best case scenario, i.e., the highest possible group confidence level achievable from the analytics engines 290 in the temporary set.

Various formulas or algorithms may be used to calculate a group confidence level of a set of analytics engines 290 where all analytics engines 290 in the set output the same query result. Such formulas and algorithms may also be used to determine a potential confidence level of the set, where the potential confidence level is equal to the resulting confidence level where all analytics engines 290 agree. For example, such an algorithm may sort the analytics engines 290 in a set of analytics engines 290, such as those in the initial temporary set, based on their confidence levels. After the sort, the first analytics engine 290 in the sorted list may have the highest confidence level, and the last one in the list may have the lowest confidence level. The group confidence level may then be initialized to the highest single confidence level, $C_1$, from among all the analytics engines 290 in the set. For each additional analytics engine 290 in the set, taken in sorted descending order of confidence levels, the group confidence level may be modified to be the current potential confidence level, plus the confidence level of the additional analytics engine 290 multiplied by a reduction factor. In other words, the group confidence level G may be adjusted to equal $G+C_i*r(i)$, for each additional analytics engine i in the set, where $r(i)$ is a reduction function as applied to analytics engine i in the sorted set. In an exemplary embodiment, $r(1)$, the reduction factor for the analytics engine 290 with the highest confidence level, may be equal to 1. The group confidence level G may be repeatedly adjusted until it accounts for all analytics engines 290 in the set. This algorithm may be applied to the initial temporary set to calculate a potential confidence level for this set of analytics engines 290.

In some embodiments, the reduction function $r(x)$ may curve, such as one that is concave upward, concave downward, or a log curve, beginning from the first analytics engine 290 to the last, as ordered based on their confidence levels. Use of the reduction function may tune the impact of each additional engine 290 on the group confidence level. The reduction function may represent a "diminish or return" model, where the effect of each additional engine diminishes (i.e., does not change the group confidence level significantly) when many analytics engines 290 agree to the same query result. It will be understood that the reduction function may vary between implementations of the analytics system 200.

Returning now to FIG. 4, at decision block 430, the analytics system 200 may determine whether the potential confidence level of the current temporary set of analytics engines 290 meets or exceeds the target confidence level. If the target confidence level is met, then at block 440, the temporary set of analytics engines 290 may be deemed to be the preliminary set that will receive queries.

On the other hand, if the potential confidence level is less than the requested confidence level, then it may be determined that the temporary set is not likely to achieve the target confidence level if all analytics engines 290 in the set are queried. Thus, the method 400 may move to decision block 450. At decision block 450, the analytics system 200 may attempt to modify the temporary set of the analytics engines 290. More specifically, in some embodiments, at decision block 450, the analytics system 200 may determine whether there exists an available analytics engine 290 not in the temporary set with a higher confidence level than a first analytics engine 290 currently in the temporary set. If such an unselected analytics engine 290 exists, then at block 460, that unselected analytics engine 290 may become selected and may thus replace the first analytics engine 290 in the temporary set. Alternatively back at decision block 450, if no such unselected analytics engine 290 exists, then at block 470, the analytics system 200 may select an additional analytics engine 290 from those not currently in the temporary set, and may add the newly selected analytics engine 290 to the temporary set.

After the temporary set is modified, the method 400 may return to block 420 and, once again, calculate the potential confidence level of the current temporary set. Then, again, at block 430, it may be determined whether the current temporary set of analytics engines 290 has a potential confidence level that at least meets the target confidence level. Until this target confidence level is met, the analytics system 200 may iteratively modify the temporary set of analytics engines 290 and recalculate the potential confidence level, according to blocks 420-470. In some embodiments, these iterations may terminate before the target confidence level is met if another termination condition is met, for example, if a predetermined number of iterations have already been performed.

Further, while performing these iterations to modify the temporary set of analytics engines 290 as needed, the analytics system 200 may avoid making changes that would result in the cost of querying the current temporary set exceeding the target cost. For example, when replacing an analytics engine 290 at block 460, or when adding an analytics engine 290 at block 470, the analytics engine 290 to be newly included in the temporary set may be selected to as not to increase the cumulative cost of querying the temporary set above the target cost.

After the iterations end (e.g., because the potential confidence level at least meets the target confidence level or because some other termination condition is met), the temporary set of analytics engine 290 may then be deemed the preliminary set of analytics engines 290. In some embodiments, the above-described iterations may be skipped, and the analytics system 200 may instead select a preliminary set by some other means. For example, the analytics system 200 may use an algorithm, such as one already existing in the art, to select a preliminary set that results in a potential confidence level closest to, or greater than, the target confidence level. Regardless of how the preliminary set of analytics engines 290 is chosen, the query unit 220 or another aspect of the analytics system 200 may query each analytics engine 290 in the preliminary set, as shown in block 340 of FIG. 3.

It will be understood that the analytics engines 290 may differ from one another, and thus, two distinct analytics engines 290 may require different formats for their queries. Thus, before querying an analytics engine 290 in the preliminary set, the analytics system 200 may first convert the original query into a corresponding second-level query in a form that is deemed appropriate for the analytics engine 290 in question. Thus, each second-level query may be directed toward providing a response to the original client query, and a second-level query may but need not be exactly the same as the original query or the same as other second-level queries corresponding to the original query. It will be understood that the format of each second-level query may be dependent on the specific analytics engine 290 to which that second-level query is directed. The analytics system 200 may thus query the preliminary set of analytics engines 290 using an appropriate second-level query for each analytics engine 290.

Figure 5:
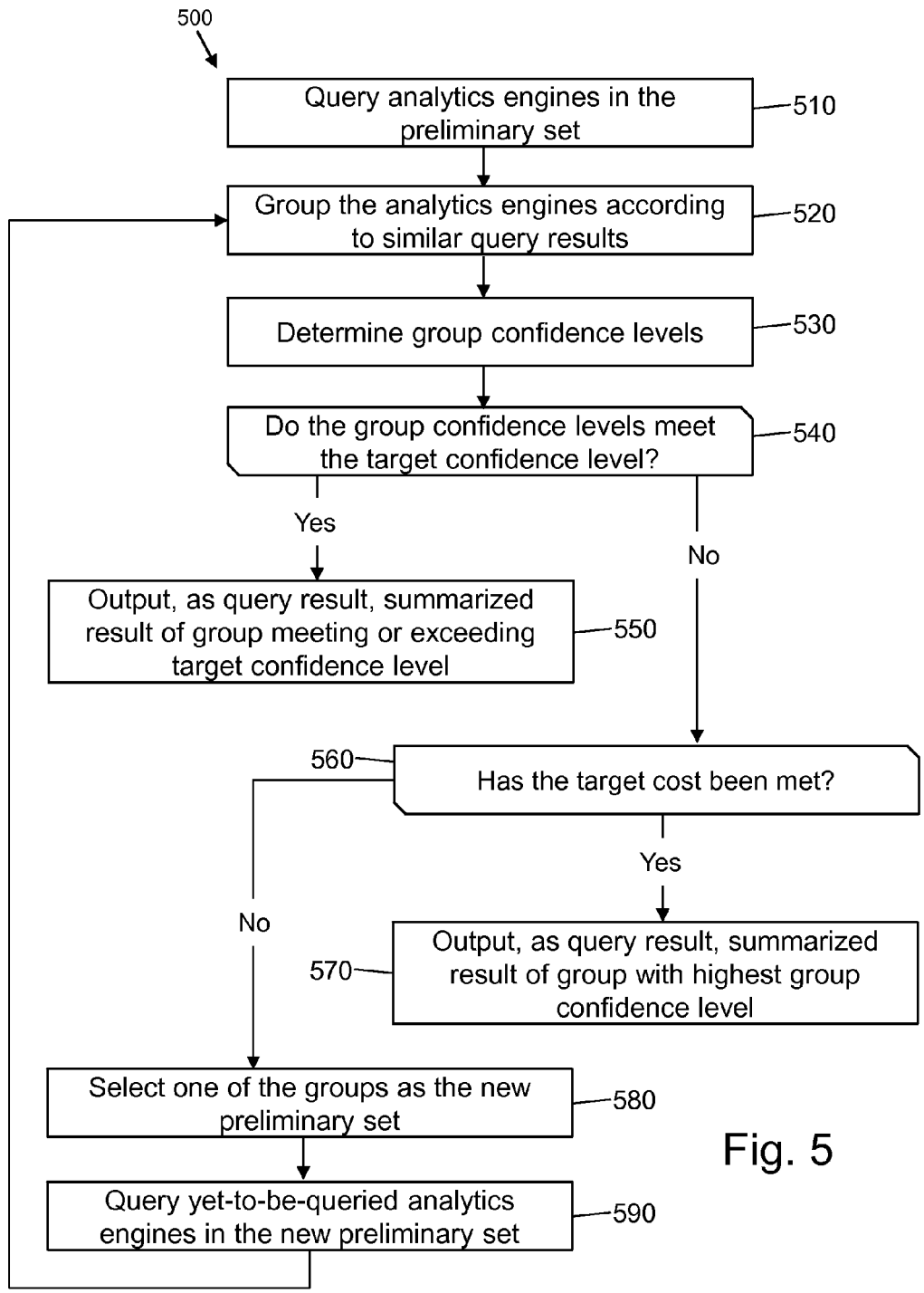
FIG. 5 is a flow diagram of a method for querying and modifying the preliminary set of analytics engines, according to some embodiments of this disclosure.

After querying the preliminary set, the analytics system 200 may modify the preliminary set, as shown at block 350 of FIG. 3, to better meet the client's target confidence level. If performed, such modification may be performed one or multiple times. FIG. 5 is a flow diagram of a method 500 for querying and modifying the preliminary set of analytics engines 290, according to an exemplary embodiment of this disclosure.

As shown, at block 510, the analytics system 200 may submit second-level queries to the analytics engines 290 in the preliminary set. After query results are received from the analytics engines 290, at block 520, the analytics system 200 may group the analytics engines according to convergence of their query results. In other words, if a first subset of the analytics engines 290 in the preliminary set returns a similar result to one another, this first subset may be grouped together into a first group. If a second subset of the analytics engines 290 returns a similar result to one another, which result is different from that returned by the first subset, that second subset of analytics engines 290 may likewise be grouped together in a second group.

At block 530, the analytics system 200 may determine a group confidence level for each group separately. For example, if the preliminary set has been divided into a first group and a second group of analytics engines 290, then a corresponding group confidence level may be calculated for each group. A group's confidence level may be based on the various confidence levels of the analytics engines 290 in that group, as well as how closely the results of the analytics engines 290 in the group agree with one another.

At decision block 540, for each group, the analytics system 200 may determine whether the corresponding group confidence level meets or exceeds the target confidence level. If a group has such a group confidence level, that group of analytics engines 290 may be selected as a new preliminary set of analytics engines, and the results returned by that group may be selected as the working results. If multiple groups have group confidence levels that meet or exceed the target confidence level, then the analytics system 200 may select one of such groups. For example, and not by way of limitation, the analytics system 200 may select the group with the highest group confidence level. At block 550, if the target confidence level was met or exceeded, then a summarized result representing the results provided by the selected group of analytics engines 290 may be returned to the client 280 as the final query result.

Alternatively, if none of the groups has a group confidence level that meets or exceeds the target confidence level, then at decision block 560, the analytics system 200 may determine whether the target cost has been met or exceeded by the querying already performed. If the target cost has been met or exceeded, then at block 570, the summarized result of the group with the highest group confidence level may be returned to the client 280 as the final query result.

At block 580, where neither the target confidence level nor the target cost has been met, a group of the analytics engines 290 with like results may still be selected, but that that group's results may not yet be deemed final. Rather, that selected group may become the new preliminary set, and the analytics system 200 may select an additional one or more analytics engines 290 to add to that preliminary set. If one or more other groups of analytics engines 290 were not selected, e.g., for having lower confidence levels, then such groups may be removed from consideration, and their corresponding analytics engines 290 may be removed from the preliminary set. Analytics engines 290 in such removed groups may, however, be added back to the preliminary set as needed, as method 500 continues.

Selecting additional analytics engines 290 to add to the preliminary set may be performed by various means. In some embodiments, for example, the analytics system 200 may choose, from among those analytics engines 290 not in the preliminary set, the analytics engine 290 with the highest confidence level. In some other embodiments, particularly if the analytics system 200 seeks to refine confidence levels of the various analytics engines 290, analytics engines 290 that do not have the highest confidence levels may be chosen. Additionally, the analytics system 200 may keep the target cost in mind when selecting additional analytics engines 290, such that analytics engines 290 with lower costs may receive priority, or analytics engines 290 whose costs would cause the total cost to exceed the target cost may be avoided or disfavored.

At block 590, the analytics system 200 may submit a second-level query to each of the newly selected analytics engines 290. The method 500 may then return to block 520, where the analytics system 200 may provide new groupings for the analytics engines 290 in the current preliminary set.

As shown in FIG. 5, the analytics system 200 may repeatedly query new engines, group the analytics engines 290 based on their results, and determine whether to output the summarized result of one of such groups, until a predetermined termination condition is met. This termination condition may be met when the target cost or the target confidence level is met or exceeded, after which point the summarized result of the selected group may be output as the final query result. In some embodiments, the analytics system 200 may limit its repetitions in searching for a selected group to provide the final query result, such that the termination condition is deemed met after a predetermined number of iterations have been performed. This may prevent the repetitions from being performed indefinitely. After the termination condition is met, at block 550, the summarized result may be output to the client 280.

The summarized result, or converged result, used as output in answer to the query may be a result that represents the one or more results received from the analytics engines 290 in the selected group. For example, and not by way of limitation, the summarized result may be a majority-vote result, which was returned by a larger number of the analytics engines 290 in the selected group than was any other result. If the result is intended to be numerical, and average result (e.g., mean, median, or mode) of the group's results may be the summarized result that is returned. Generally, however, the final query result may be a single answer to the query, as opposed to a set of options of the type that a search engine would typically return.

In some embodiments, the analytics system 200 may enable the client 280 to provide feedback on the query result received. This feedback may be used to update the confidence levels of the analytics engines 290 whose results were incorporated into the final query result.

The client 280 may be enabled to indicate approval of the final result, to approve of one or more individual results of one or more individual analytics engines 290 incorporated in the overall final result, or a combination of both. Feedback may be received by the analytics system 200 in various ways. For example, in some cases, the individual results incorporated into the final result may be displayed to the client 280. In such as case, the client's selection of a particular individual result of a particular analytics engine 290 may be recorded as positive feedback, or approval. For another example, approval and disapproval selection mechanisms may be provided, where approval is interpreted as positive feedback and disapproval is interpreted as negative feedback. When no feedback is received with respect to a particular analytics engine 290, such lack of feedback may be interpreted as neutral feedback.

The feedback received may be used to adjust the confidence levels of the analytics engines 290. Feedback may be translated into normalized numeric input, which input may have some relation to a numeric representation of confidence levels. For example, and not by way of limitation, positive feedback may correspond to a feedback score of 1, negative feedback may correspond to a feedback score of −1, and neutral feedback may correspond to a feedback score of 0. Accordingly, a predetermined algorithm or formula may be applied to adjust a confidence level based on received feedback for an analytics engine 290.

In some embodiments, an algorithm for adjusting confidence levels of the analytics engines 290 may be as follows: If only a single analytics engine 290 contributed to the final result, and the feedback for the final result is positive, the confidence level of that analytics engine 290 may be increased (e.g. by ten percent). If the feedback for the final result is negative, then the confidence level of that analytics engine 290 may be decreased (e.g. by ten percent). If there is only neutral feedback, then the confidence level of that analytics engine 290 may be unchanged. If multiple analytics engines 290 contributed to the final result and only some of those analytics engines 290 received positive feedback, then the confidence levels may be increased for those analytics engines 290, and the confidence levels may be decreased for the analytics engines 290 that did not receive positive feedback. If only some analytics engines 290 received positive feedback, then an analytics engine 290 that received neutral feedback may experience a decrease in confidence level that is less than the decrease given to those analytics engines 290 that received negative feedback for the same final result. For example, the decrease for neutral feedback may be a five percent decrease, while the decrease for negative feedback may be ten percent. It will be understood that these numbers and feedback changes are provided for illustrative purposes only.

In some embodiments of the analytics system 200, the confidence levels of the analytics engines 290 contributing to the final result may be affected merely by contributing to that final result, regardless of whether feedback is received from the client 280. Because the entire group of analytics engines 290 that contributed to the final result had similar results (because they were grouped together), their confidence levels may be adjusted to make those confidence levels more similar to one another. For example, the confidence levels of the analytics engines 290 that do not have the highest confidence level in the group may all be increased, but such increases may be capped so that the confidence levels do not exceed the highest confidence level in the group. Analogously, the highest confidence level in the group may be decreased, but not so as to fall below any of the other confidence levels in the group after their various increases. Further, such decrease may be less than a decrease resulting from receiving negative feedback, if applicable to the group.

Accordingly, some embodiments of the analytics system 200 may use confidence levels of various analytics engines 290 to provide relatively accurate results to clients 280, where the accuracy of such results is based at least partially on the cost the clients 280 are willing to pay. Further, the confidence levels may be dynamically adjustable based on the contributions made by the analytics engines 290. These and other embodiments are within the scope of this disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving a query;
    establishing a target confidence level for the query, the target confidence level representing a requested level of accuracy for a result of the query;
    assigning a plurality of confidence levels to a plurality of analytics engines, the plurality of confidence levels comprising a respective confidence level for each analytics engine in the plurality of analytics engines;
    selecting a preliminary set of analytics engines from among the plurality of analytics engines;
    querying each analytics engine in the preliminary set of analytics engines based on the query;
    receiving a plurality of responses to the query, the plurality of responses comprising a response to the query from each analytics engine in the preliminary set of analytics engines;
    grouping the plurality of responses to the query into two or more groups of responses to the query, wherein each group is associated with a set of analytics engines that provided the set of responses in the group;
    calculating two or more group confidence levels for the two or more groups, wherein a group confidence level is calculated for each group based on the respective confidence level of each analytics engine in the set of analytics engines associated with the group;
    selecting, by a computer processor, a first group of the two or more groups of responses to the query, wherein the selecting is at least partially based on the target confidence level and the group confidence level of the first group; and
    summarizing into a final result the first group of responses to the query, the final result being an answer to the query.

2. The method of claim 1, wherein the final result excludes the two or more groups of responses to the queries other than the first group.

3. The method of claim 1, further comprising adjusting the individual confidence levels of the analytics engines in the selected group based on contributions of those analytics engines to the final result.

4. The method of claim 1, wherein the assigning the plurality of confidence levels to the plurality of analytics engines comprises assigning a first confidence level to a first analytics engine for potential queries in a first category and assigning a second confidence level to the first analytics engine for potential queries in a second category.

5. The method of claim 1, further comprising, repeatedly, modifying which analytics engines are in the first group and recalculating the group confidence level for the first group, until a termination condition is met, wherein the termination condition is met when the group confidence level for the first group at least meets the target confidence level.

6. The method of claim 1, wherein the selecting the preliminary set of analytics engines from among the plurality of analytics engines is based at least partially on a target monetary cost of the query.

7. The method of claim 1, wherein the grouping the plurality of responses to the query into the two or more groups of responses to the query comprises dividing the plurality of responses based on similarity, and wherein each group comprises a corresponding set of responses to the query that are similar to one another.

8. A system comprising:
    a memory having computer readable instructions; and
    one or more processors for executing the computer readable instructions, the computer readable instructions comprising:
        receiving a query;
        establishing a target confidence level for the query, the target confidence level representing a requested level of accuracy for a result of the query;
        assigning a plurality of confidence levels to a plurality of analytics engines, the plurality of confidence levels comprising a respective confidence level for each analytics engine in the plurality of analytics engines; and
        selecting a preliminary set of analytics engines from among the plurality of analytics engines;
        querying each analytics engine in the preliminary set of analytics engines based on the query;
        receiving a plurality of responses to the query, the plurality of responses comprising a response to the query from each analytics engine in the preliminary set of analytics engines;
        grouping the plurality of responses to the query into two or more groups of responses to the query, wherein each group is associated with a set of analytics engines that provided the set of responses in the group;
        calculating two or more group confidence levels for the two or more groups, wherein a group confidence level is calculated for each group based on the respective confidence level of each analytics engine in the set of analytics engines associated with the group;

selecting a first group of the two or more groups of responses to the query, wherein the selecting is at least partially based on the target confidence level and the group confidence level of the first group; and summarizing into a final result the first group of responses to the query, the final result being an answer to the query.

9. The system of claim 8, wherein the final result excludes the two or more groups of responses to the queries other than the first group.

10. The system of claim 8, the computer readable instructions further comprising adjusting the individual confidence levels of the analytics engines in the selected group based on contributions of those analytics engines to the final result.

11. The system of claim 8, the computer readable instructions further comprising, repeatedly, modifying which analytics engines are in the first group and recalculating the group confidence level for the first group, until a termination condition is met, wherein the termination condition is met when the group confidence level for the first group at least meets the target confidence level.

12. The system of claim 8, wherein the selecting the preliminary set of analytics engines from among the plurality of analytics engines is based at least partially on a target monetary cost of the query.

13. The system of claim 8, wherein the assigning the plurality of confidence levels to the plurality of analytics engines comprises assigning a first confidence level to a first analytics engine for potential queries in a first category and assigning a second confidence level to the first analytics engine for potential queries in a second category.

14. The system of claim 8, wherein the grouping the plurality of responses to the query into the two or more groups of responses to the query comprises dividing the plurality of responses based on similarity, and wherein each group comprises a corresponding set of responses to the query that are similar to one another.

15. A computer program product comprising a computer readable storage medium having computer readable program code embodied thereon, the computer readable program code executable by a processor to perform a method comprising:

receiving a query;

establishing a target confidence level for the query, the target confidence level representing a requested level of accuracy for a result of the query;

assigning a plurality of confidence levels to a plurality of analytics engines, the plurality of confidence levels comprising a respective confidence level for each analytics engine in the plurality of analytics engines;

selecting a preliminary set of analytics engines from among the plurality of analytics engines;

querying each analytics engine in the preliminary set of analytics engines based on the query;

receiving a plurality of responses to the query, the plurality of responses comprising a response to the query from each analytics engine in the preliminary set of analytics engines;

grouping the plurality of responses to the query into two or more groups of responses to the query, wherein each group is associated with a set of analytics engines that provided the set of responses in the group;

calculating two or more group confidence levels for the two or more groups, wherein a group confidence level is calculated for each group based on the respective confidence level of each analytics engine in the set of analytics engines associated with the group;

selecting a first group of the two or more groups of responses to the query, wherein the selecting is at least partially based on the target confidence level and the group confidence level of the first group; and summarizing into a final result the first group of responses to the query, the final result being an answer to the query.

16. The computer program product of claim 15, wherein the final result excludes the two or more groups of responses to the queries other than the first group.

17. The computer program product of claim 15, the method further comprising, repeatedly, modifying which analytics engines are in the first group and recalculating the group confidence level for the first group, until a termination condition is met, wherein the termination condition is met when the group confidence level for the first group at least meets the target confidence level.

18. The computer program product of claim 15, wherein the selecting the preliminary set of analytics engines from among the plurality of analytics engines is based at least partially on a target monetary cost of the query.

19. The computer program product of claim 15, wherein the assigning the plurality of confidence levels to the plurality of analytics engines comprises assigning a first confidence level to a first analytics engine for potential queries in a first category and assigning a second confidence level to the first analytics engine for potential queries in a second category.

20. The computer program product of claim 15, wherein the grouping the plurality of responses to the query into the two or more groups of responses to the query comprises dividing the plurality of responses based on similarity, and wherein each group comprises a corresponding set of responses to the query that are similar to one another.

* * * * *